US008776574B2

(12) United States Patent
Miyagawa (10) Patent No.: US 8,776,574 B2
(45) Date of Patent: Jul. 15, 2014

(54) FLUID LEVEL MEASUREMENT APPARATUS (75) Inventor: Isao Miyagawa, Kariya (JP)

(73) Assignee: Denso Corporation, Kariya (JP)

( * ) Notice: Subject to any disclaimer, the term of this patent is extended or adjusted under 35 U.S.C. 154(b) by 319 days.

(21) Appl. No.: 13/345,992

(22) Filed: Jan. 9, 2012

(65) Prior Publication Data

US 2012/0174667 A1 Jul. 12, 2012

(30) Foreign Application Priority Data

Jan. 10, 2011 (JP) ................................. 2011-002619

(51) Int. Cl.
*G01F 23/00* (2006.01)
*B60R 16/02* (2006.01)

(52) U.S. Cl.
USPC .................. 73/1.73; 73/306; 73/309; 73/313; 340/618; 340/620; 340/623; 340/625; 702/55; 702/91; 702/104

(58) Field of Classification Search
USPC .................. 73/1.73, 306, 309, 313; 200/84 R; 340/2.1, 618, 620, 623, 625; 702/55, 702/91, 104, 116, 117, 120
See application file for complete search history.

(56) References Cited

U.S. PATENT DOCUMENTS

| | | | | | |
|---|---|---|---|---|---|
| 4,185,207 | A | * | 1/1980 | Bengtsson | 307/118 |
| 4,418,392 | A | * | 11/1983 | Hata | 702/91 |
| 4,513,616 | A | * | 4/1985 | Bezard et al. | 73/295 |
| 4,716,536 | A | * | 12/1987 | Blanchard | 702/100 |
| 4,731,730 | A | * | 3/1988 | Hedrick et al. | 702/47 |
| 4,780,705 | A | * | 10/1988 | Beane | 340/620 |
| 4,799,174 | A | * | 1/1989 | Kramer et al. | 702/33 |
| 5,124,933 | A | * | 6/1992 | Maier | 702/55 |
| 5,128,652 | A | * | 7/1992 | Slocum | 340/502 |
| 5,159,318 | A | * | 10/1992 | Kronberg | 340/622 |
| 5,162,725 | A | * | 11/1992 | Hodson et al. | 324/115 |
| 5,210,769 | A | * | 5/1993 | Seidel et al. | 73/295 |
| 5,377,128 | A | * | 12/1994 | McBean | 702/91 |

(Continued)

FOREIGN PATENT DOCUMENTS

| | | |
|---|---|---|
| EP | 2 230 493 | 9/2010 |
| JP | 2006-064640 | 3/2006 |

(Continued)

OTHER PUBLICATIONS

Office Action dated Oct. 2, 2012 issued in corresponding Japanese Application No. 2011-002619 with English translation.

*Primary Examiner* — Hezron E Williams
*Assistant Examiner* — Alexander Mercado
(74) *Attorney, Agent, or Firm* — Harness, Dickey & Pierce, PLC (57) ABSTRACT

A fluid level measurement apparatus supports multiple fluid level sensors of different types, each of which detects a level of fluid and produces an output indicative of the detected fluid level in a different way. The fluid level measurement apparatus is connected to any one of the supported fluid level sensors to measure the fluid level. The fluid level measurement apparatus includes a calculation circuit, multiple output circuits, a determination circuit, and a selection circuit. The calculation circuit calculates the fluid level from a detection voltage. Each output circuit generates the detection voltage based on the output of a corresponding fluid level sensor. The determination circuit determines the connected fluid level sensor. The selection circuit selects the output circuit corresponding to the determined fluid level sensor and allows the calculation circuit to obtain the detection voltage generated by the selected output circuit.

7 Claims, 5 Drawing Sheets

(56) References Cited

U.S. PATENT DOCUMENTS

| | | | |
|---|---|---|---|
| 5,798,945 A * | 8/1998 | Benda | 702/24 |
| 5,874,899 A * | 2/1999 | Barmore et al. | 340/623 |
| 5,982,290 A * | 11/1999 | Berger et al. | 340/618 |
| 6,115,654 A * | 9/2000 | Eid et al. | 701/29.8 |
| 6,421,625 B1 * | 7/2002 | Cianciara et al. | 702/130 |
| 6,481,276 B1 * | 11/2002 | Neuhaus et al. | 73/304 C |
| 6,529,845 B1 * | 3/2003 | Beck, II | 702/100 |
| 6,575,010 B2 * | 6/2003 | Colman et al. | 73/1.73 |
| 6,748,805 B2 * | 6/2004 | Lease | 73/313 |
| 7,239,246 B2 * | 7/2007 | Picco et al. | 340/618 |
| 7,366,624 B2 * | 4/2008 | Wobschall | 702/91 |
| 7,470,060 B1 * | 12/2008 | Hoben et al. | 374/143 |
| 7,605,695 B2 * | 10/2009 | Presicci | 340/511 |
| 7,808,379 B2 * | 10/2010 | Hedtke et al. | 340/539.26 |
| 7,880,632 B2 * | 2/2011 | Waser et al. | 340/680 |
| 7,937,237 B2 * | 5/2011 | Craemer et al. | 702/116 |
| 8,004,415 B2 * | 8/2011 | Boss et al. | 340/618 |
| 8,330,603 B1 * | 12/2012 | Gibb | 340/618 |
| 2005/0229700 A1 * | 10/2005 | Chai et al. | 73/304 R |
| 2008/0111680 A1 * | 5/2008 | Presicci | 340/539.22 |
| 2009/0088987 A1 * | 4/2009 | Lyon | 702/54 |
| 2010/0117842 A1 * | 5/2010 | Fachidis | 340/618 |
| 2010/0154534 A1 * | 6/2010 | Hampton | 73/304 C |
| 2010/0259397 A1 * | 10/2010 | Du et al. | 340/618 |
| 2010/0301878 A1 * | 12/2010 | Armbruster et al. | 324/676 |
| 2011/0270542 A1 * | 11/2011 | Chappell et al. | 702/55 |
| 2012/0167660 A1 * | 7/2012 | Calcote | 73/1.73 |
| 2012/0253706 A1 * | 10/2012 | Abhyankar et al. | 702/55 |

FOREIGN PATENT DOCUMENTS

| | | |
|---|---|---|
| JP | 2009-236797 | 10/2009 |
| JP | 2010-032439 | 2/2010 |
| JP | 2010-078320 | 4/2010 |
| JP | 2010-201315 | 9/2010 |

* cited by examiner

FLUID LEVEL MEASUREMENT APPARATUS

CROSS REFERENCE TO RELATED APPLICATION

This application is based on and claims priority to Japanese Patent Application No. 2011-2619 filed on Jan. 10, 2011, the contents of which are incorporated by reference.

FIELD

The present invention relates to a fluid level measurement apparatus configured to be connected to a fluid level sensor to measure the level of fluid in a container by using the fluid level sensor.

BACKGROUND

JP-2009-236797A discloses a fluid level measurement apparatus. As shown in FIG. 3 of JP-2009-236797A, the fluid level measurement apparatus includes a magnetoelectric element as a magnetoelectric fluid level sensor, a circuit, and an IC. A voltage between the output terminal and the ground terminal of the magnetoelectric element changes with the fluid level. The output of the magnetoelectric element is inputted to the circuit so that the circuit can generate a detection voltage. The IC receives the detection voltage from the circuit and calculates the fluid level based on the detection voltage.

JP-2010-78320A discloses another fluid level measurement apparatus including an electrical resistance element as an electrical resistance fluid level sensor. An electrical resistance of the electrical resistance element changes with the fluid level.

Typically, an electrical resistance fluid level sensor using an electrical resistance element as disclosed in JP-2009-236797A costs less than a magnetoelectric fluid level sensor using a magnetoelectric element as disclosed in JP-2009-236797A. However, depending on types of fluid, the detection accuracy of the electrical resistance fluid level sensor is less than that of the magnetoelectric fluid level sensor. Therefore, it is preferable to use different types of fluid level sensors according to types of fluid.

In JP-2009-236797A, the circuit for generating the detection voltage is specialized to process the output of the magnetoelectric fluid level sensor. Therefore, if the magnetoelectric fluid level sensor is replaced with the electrical resistance fluid level sensor as disclosed in JP-2009-236797A, the circuit cannot generate the detection voltage accurately. As a result, the IC cannot calculate the fluid level accurately.

SUMMARY

In view of the above, it is an object of the present invention to provide a fluid level measurement apparatus configured to support various types of fluid level sensors.

According to an aspect of the present invention, a fluid level measurement apparatus supports multiple fluid level sensors of different types, each of which detects a level of fluid and produces an output indicative of the detected fluid level in a different way. The fluid level measurement apparatus is connected to any one of the supported fluid level sensors to measure the fluid level. The fluid level measurement apparatus includes a calculation circuit, multiple output circuits, a determination circuit, and a selection circuit. The calculation circuit calculates the fluid level from a detection voltage. Each output circuit generates the detection voltage based on the output of a corresponding fluid level sensor. The determination circuit determines the connected fluid level sensor. The selection circuit selects the output circuit corresponding to the determined fluid level sensor and allows the calculation circuit to obtain the detection voltage generated by the selected output circuit.

BRIEF DESCRIPTION OF THE DRAWINGS

The above and other objects, features, and effects will become more apparent from the following description and drawings in which like reference numerals depict like elements. In the drawings.

DETAILED DESCRIPTION OF THE PREFERRED EMBODIMENTS

First Embodiment

Figure 1:
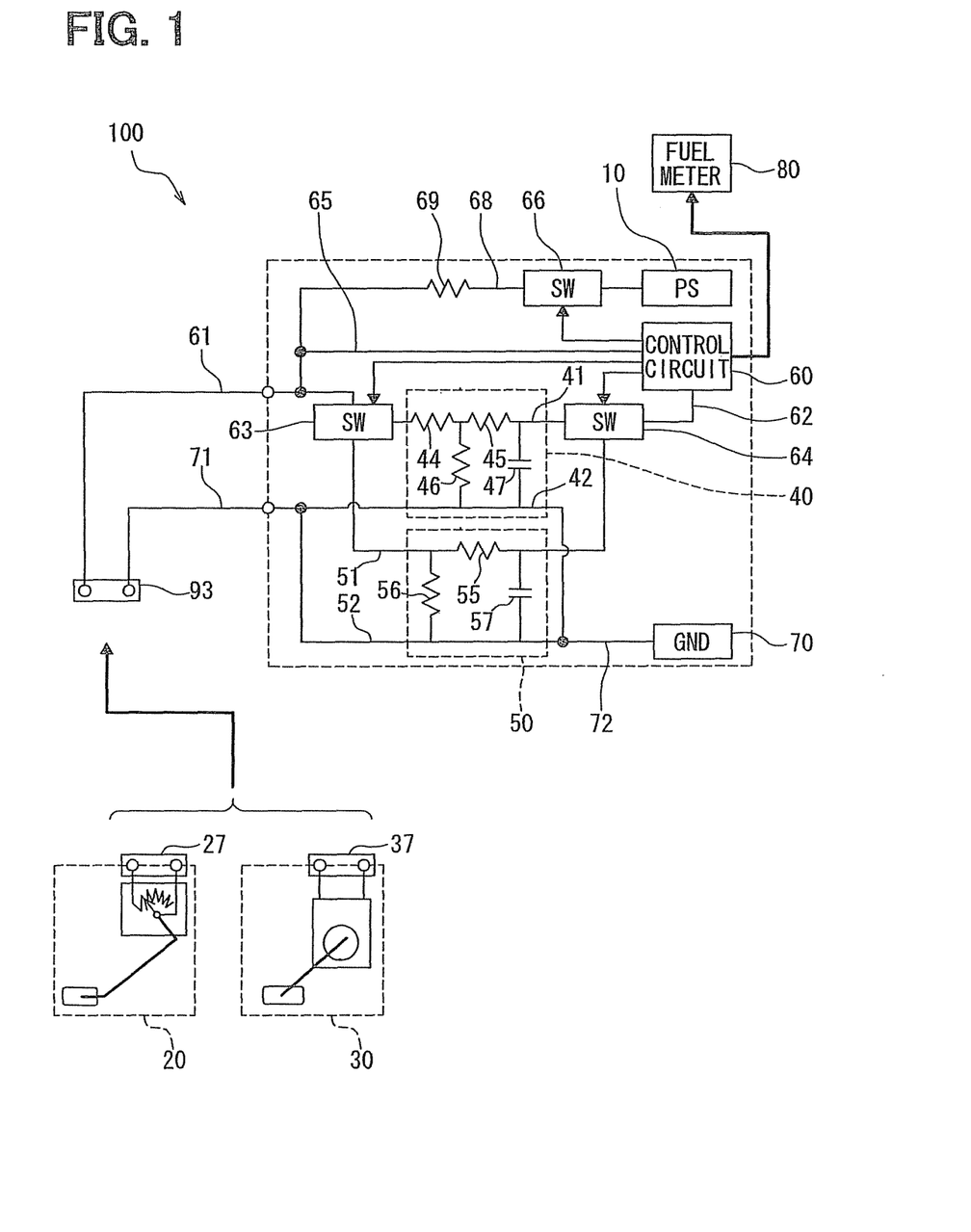
FIG. 1 is a block diagram of a fluid level measurement apparatus according to a first embodiment of the present invention.

A fluid level measurement apparatus 100 according to a first embodiment of the present invention is described below with reference to FIG. 1. The fluid level measurement apparatus 100 is connected to a fluid level sensor and measures the level of fluid (i.e., fuel) in a fuel tank 90 of a vehicle through the connected fluid level sensor. Specifically, the fluid level measurement apparatus 100 is designed to support multiple fluid level sensors of different types, each of which detects the fluid level and produces an output indicative of the detected fluid level in a different way. The fluid level measurement apparatus 100 is connected to any one of the supported fluid level sensors and measures the fluid level through the connected fluid level sensor. For example, the fluid level measurement apparatus 100 can be part of a combination meter assembly of the vehicle, and the fluid level measured by the fluid level measurement apparatus 100 can be displayed on a fuel meter 80 of the combination meter assembly.

Figure 2A:
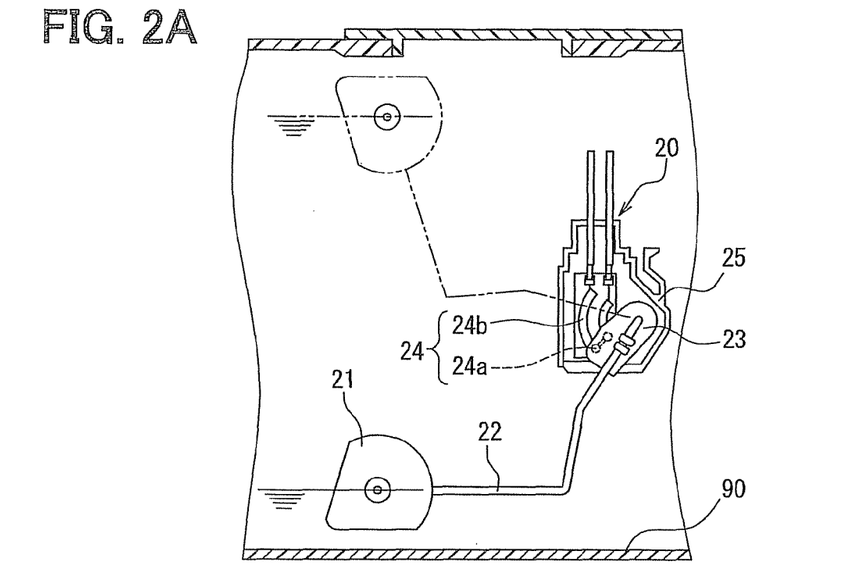
FIG. 2A is a diagram illustrating an electrical resistance fluid level sensor connectable to the fluid level measurement apparatus of FIG. 1.

FIG. 2A shows an electrical resistance fluid level sensor 20, which is one type of the fluid level sensors supported by and connectable to the fluid level measurement apparatus 100. The electrical resistance fluid level sensor 20 includes a float 21, a float arm 22, an arm holder 23, a variable resistor 24, a housing 25, and a plug section 27 (refer to FIG. 1).

The float 21 is made of a material having a higher specific gravity than the fuel in the fuel tank 90. The float 21 can float at the level of the fluid. The float arm 22 is shaped like a circular shaft and made of a metal material such as stainless steel. A first end of the float arm 22 is coupled to the float 21. A second end of the float arm 22 is coupled to the arm holder 23. The arm holder 23 is made of a material having a good resistance to oil and solvent and having a good mechanical property. For example, the arm holder 23 can be made of polyoxymethylene (POM) resin. The arm holder 23 has a bearing portion and is rotatably coupled through the bearing portion to the housing 25.

The variable resistor 24 includes a sliding contact 24a and a pair of resistor patterns 24b. The resistor patterns 24b are formed on a circuit board held in the housing 25. Each resistor pattern 24b has a circular arc shape and is arranged around the center of rotation of the arm holder 23. The sliding contact 24a is attached to the arm holder 23. According to rotation of the arm holder 23, the sliding contact 24a slides with respect to the resistor patterns 24b with keeping in contact with the resistor patterns 24b. A resistance of the variable resistor 24 varies according to a contact position where the sliding contact 24a is in contact with the resistor patterns 24b.

The housing 25 is made of a material having a good resistance to organic solvent such as fuel. For example, the housing 25 can be made of polyoxymethylene (POM) resin. The housing 25 is fixed to a wall surface of an object such as a fuel pump module (not shown) so that the electrical resistance fluid level sensor 20 can be fixed with respect to the fuel tank 90. The plug section 27 (refer to FIG. 1) is connected to a socket section 93 (refer to FIG. 1) of the fluid level measurement apparatus 100. The plug section 27 is made of a flexible resin material and mates with the socket section 93. The resistance of the variable resistor 24 is outputted through the plug section 27 to the fluid level measurement apparatus 100.

The electrical resistance fluid level sensor 20 operates as follows. The float 21 moves up and down according to the fluid level. The reciprocating movement of the float 21 is converted by the float arm 22 into a rotational movement and transmitted to the arm holder 23. Thus, the arm holder 23 rotates relative to the housing 25 according to the level of the fuel in the fuel tank 90. The rotational angle of the arm holder 23 is detected as the resistance of the variable resistor 24, and the electrical resistance fluid level sensor 20 outputs the resistance of the variable resistor 24 as the detected fluid level.

Figure 2B:
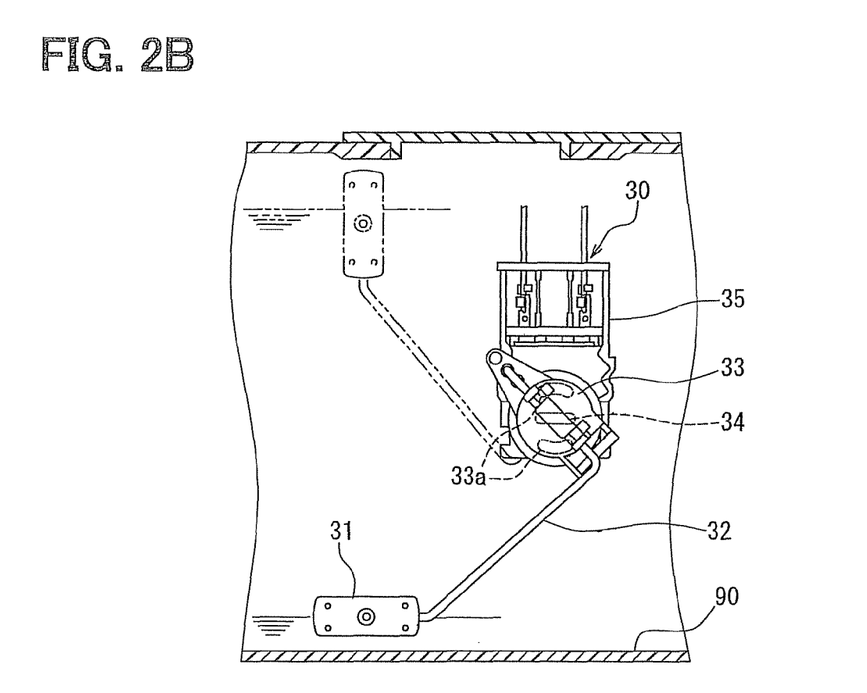
FIG. 2B is a diagram illustrating a magnetoelectric fluid level sensor connectable to the fluid level measurement apparatus of FIG. 1.

FIG. 2B shows a magnetoelectric fluid level sensor 30, which is another type of the fluid level sensors, supported by and connectable to the fluid level measurement apparatus 100. The magnetoelectric fluid level sensor 30 includes a float 31, a float arm 32, a magnet holder 33, a magnetoelectric conversion element 34, a housing 35, and a plug section 37.

The float 31 and the float arm 32 are configured in the same manner as the float 21 and the float arm 22 of the electrical resistance fluid level sensor 20, respectively. A first end of the float arm 32 is coupled to the float 31. A second end of the float arm 32 is coupled to the magnet holder 33. The magnet holder 33 is made of a polyoxymethylene (POM) resin, or the like. The magnet holder 33 has a bearing portion and is rotatably coupled through the bearing portion to the housing 35. A pair of magnets 33a having a ferromagnetic property are held inside the magnet holder 33 in such a manner that the magnetoelectric conversion element 34 is located between the pair of magnets 33a. Thus, a magnet field generated by the pair of magnets 33a passes through the magnetoelectric conversion element 34.

The magnetoelectric conversion element 34 is a Hall element and outputs a voltage corresponding to the density of magnetic flux passing through the magnetoelectric conversion element 34. The magnetoelectric conversion element 34 is located inside the magnet field generated by the pair of magnets 33a. The pair of magnets 33a rotates with the magnet holder 33 so that the density of magnetic flux passing through the magnetoelectric conversion element 34 can change. Thus, the voltage outputted from the magnetoelectric conversion element 34 changes with the rotation of the magnet holder 33.

The housing 35 is made of a polyoxymethylene (POM) resin or the like. The housing 35 is fixed to a wall surface of an object such as a fuel pump module (not shown) so that the magnetoelectric fluid level sensor 30 can be fixed with respect to the fuel tank 90. The housing 35 has a shaft rotatably supported by the bearing portion of the magnet holder 33. The magnetoelectric conversion element 34 is located inside the shaft of the housing 35. The plug section 37 (refer to FIG. 1) is connected to the socket section 93 (refer to FIG. 1) of the fluid level measurement apparatus 100. The plug section 37 is made of a flexible resin material and mates with the socket section 93. The voltage of the magnetoelectric conversion element 34 is outputted through the plug section 37 to the fluid level measurement apparatus 100.

The magnetoelectric fluid level sensor 30 operates as follows. The float 31 moves up and down according to the fluid level. The reciprocating movement of the float 31 is converted by the float arm 32 into a rotational movement and transmitted to the magnet holder 33. Thus, the magnet holder 33 rotates relative to the housing 35 according to the level of the fuel in the fuel tank 90. The rotational angle of the magnet holder 33 is detected as the voltage of the magnetoelectric conversion element 34, and the magnetoelectric fluid level sensor 30 outputs the voltage of the magnetoelectric conversion element 34 as the detected fluid level.

Next, the fluid level measurement apparatus 100 is described in detail below with reference to FIG. 1. The fluid level measurement apparatus 100 includes the socket section 93, a meter power supply circuit 10, a ground circuit 70, a first output circuit 40, a second output circuit 50, and a control circuit 60.

The socket section 93 can mate with the plug section 27 of the electrical resistance fluid level sensor 20 and the plug section 37 of the magnetoelectric fluid level sensor 30. The socket section 93 is part of the fuel pump module (not shown) located in the fuel tank 90 and connected to any one of the plug section 27 and the plug section 37 inside the fuel tank 90.

The meter power supply circuit 10 is connected to a battery of the vehicle and supplied with power mainly from the battery. The meter power supply circuit 10 converts the supplied power into suitable power for the connected fluid level sensor and supplies the converted power to the connected fluid level sensor. For example, the meter power supply circuit 10 applies a voltage of 5 volts as the power to the connected fluid level sensor. The connected fluid level sensor operates on the power supplied from the meter power supply circuit 10 and detects the fluid level.

The meter power supply circuit 10 is electrically connected through wires 61 and 68 to the socket section 93 to supply the power to the fluid level sensor connected to the fluid level measurement apparatus 100. Specifically, the wire 68 is arranged in the combination meter assembly and connects the wire 61 to the meter power supply circuit 10. The wire 61 connects the wire 68 to the socket section 93, which is located in the fuel tank 90. The wire 68 is provided with a power switch 66 and a resistor 69. The power switch 66 is turned ON and OFF in accordance with a control signal from the control circuit 60 to allow and interrupt the power supply from the meter power supply circuit 10 to the connected fluid level sensor. The resistor 69 is a passive element having a predetermined resistance and stabilizes the voltage applied from the meter power supply circuit 10 to the connected fluid level sensor.

For example, the ground circuit 70 is grounded to a body (i.e., chassis) of the vehicle. The ground circuit 70 applies a ground voltage to the fluid level sensor through a wire 71, a wire 72, the first output circuit 40, and the second output circuit 50. The wire 72 connects the socket section 93, which is located in the fuel tank 90, to the first and second output circuits 40 and 50, which are located in the combination meter assembly. The wire 72 connects the ground circuit 70 to the first and second output circuits 40 and 50.

The first output circuit 40 generates a detection voltage based on the output of the electrical resistance fluid level sensor 20. The first output circuit 40 includes an output wire 41, a ground wire 42, resistors 44, 45, and 46, and a capacitor 47. The output wire 41 is used to transmit the output of the electrical resistance fluid level sensor 20 to the control circuit 60 and connects an output switch 63 to an output switch 64. The wire 42 is used to apply the ground voltage to the electrical resistance fluid level sensor 20 and connects the wire 71 to the wire 72. Each of the resistors 44, 45, and 46 is a passive element having a predetermined resistance. The resistors 44, 45 are connected in series to the wire 41. The resistor 46 is connected between the wire 42 and the wire 41 between the resistors 44 and 45. The capacitor 47 is a passive element having a predetermined capacitance. The capacitor 47 is connected between the wire 42 and the wire 41 between the resistor 45 and the output switch 64. The resistor 45 and the capacitor 47 form a low-pass filter.

The second output circuit 50 generates a detection voltage based on the output of the magnetoelectric fluid level sensor 30. The second output circuit 50 includes an output wire 51, a ground wire 52, resistors 55 and 56, and a capacitor 57. The output wire 51 is used to transmit the output of the magnetoelectric fluid level sensor 30 to the control circuit 60 and connects the output switch 63 to the output switch 64. The wire 52 is used to apply the ground voltage to the magnetoelectric fluid level sensor 30 and connects the wire 71 to the wire 72. Each of the resistors 55 and 56 is a passive element having a predetermined resistance. The resistor 55 is connected to the wire 51. The resistor 56 is connected between the wire 52 and the wire 51 between the output switch 63 and the resistor 55. The capacitor 57 is a passive element having a predetermined capacitance. The capacitor 57 is connected between the wire 52 and the wire 41 between the resistor 45 and the output switch 64. The resistor 55 and the capacitor 57 form a low-pass filter.

The control circuit 60 is a microcomputer or the like and executes operations based on programs. The control circuit 60 is connected through the wire 62 to the output switch 64. The control circuit 60 outputs a selection signal, for selecting either the first output circuit 40 or the second output circuit 50, to the output switches 63 and 64. The output switches 63 and 64 apply the detection voltage generated by the selected output circuit to the control circuit 60 through the wire 62. Further, as mentioned above, the control circuit 60 outputs the control signal to the power switch 66 to allow and interrupt the power supply to the fluid level sensor connected to the socket section 93. Furthermore, the control circuit 60 is connected to the wire 68 between the resistor 69 and a node between the wire 68 and the wire 61.

The control circuit 60 applies a constant current having a predetermined magnitude through the wire 65 to the fluid level sensor connected to the socket section 93. When the control circuit 60 applies the constant current to the fluid level sensor, the control circuit 60 turns OFF the power switch 66 to interrupt the power supply to the connected fluid level sensor and also outputs the selection signal for selecting the first output circuit 40 to the output switches 63 and 64. The control circuit 60 obtains a voltage generated by the first output circuit 40 upon application of the constant current to the connected fluid level sensor and measures an internal resistance of the connected fluid level sensor based on the obtained voltage. The control circuit 60 prestores a predetermined threshold resistance Rx for determining the fluid level sensor connected to the socket section 93. Assuming that the electrical resistance fluid level sensor 20 has an internal resistance of 500Ω to 800Ω, the threshold resistance Rx can be set to 1 kΩ, for example. The control circuit 60 determines, based on the measured internal resistance and the threshold resistance Rx, which type of fluid level sensor is connected to the socket section 93. Then, the control circuit 60 outputs the selection signal to the output switches 63 and 64 to select the output circuit corresponding to the determined fluid level sensor.

Specifically, when the control circuit 60 determines that the electrical resistance fluid level sensor 20 is connected to the socket section 93, the control circuit 60 controls the output switches 63, 64 so that the output of the electrical resistance fluid level sensor 20 can be inputted to the wire 41. Thus, the first output circuit 40 generates the detection voltage based on the output of the electrical resistance fluid level sensor 20. In contrast, when the control circuit 60 determines that the magnetoelectric fluid level sensor 30 is connected to the socket section 93, the control circuit 60 controls the output switches 63, 64 so that the output of the magnetoelectric fluid level sensor 30 can be inputted to the wire 51. Thus, the second output circuit 50 generates the detection voltage based on the output of the magnetoelectric fluid level sensor 30. In this way, the control circuit 60 calculates the fluid level from the detection voltage that is generated based on the output of the electrical resistance fluid level sensor 20 or the magnetoelectric fluid level sensor 30.

Figure 3:
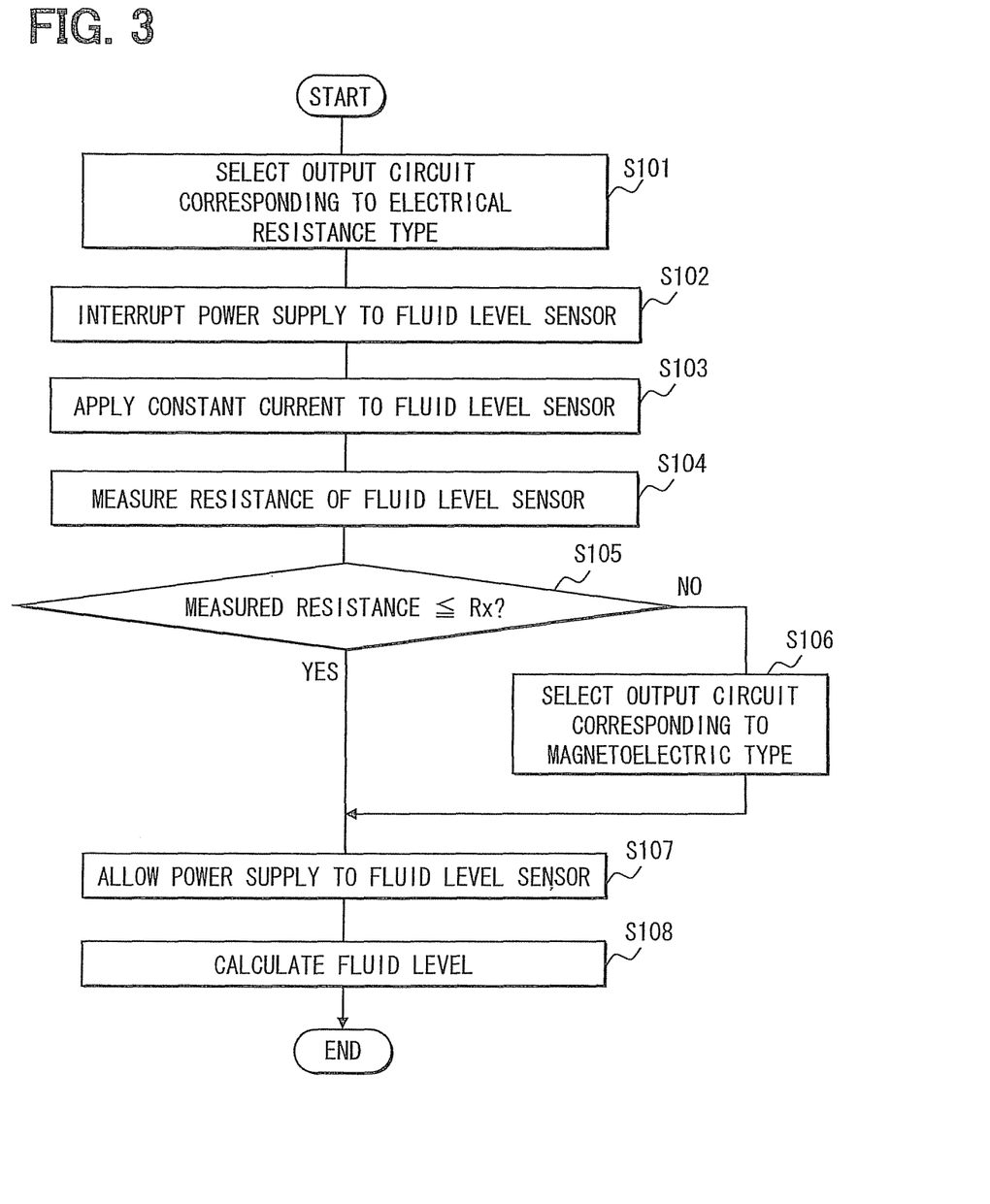
FIG. 3 is a flow diagram illustrating a control process executed by a control circuit of the fluid level measurement apparatus of FIG. 1.

Next, a control process executed by the control circuit 60 to determine the fluid level sensor connected to the fluid level measurement apparatus 100 and to calculate the fluid level from the detection voltage generated based on the output of the determined fluid level sensor is described below with reference to FIG. 3. The control circuit 60 starts to execute the control process when the combination meter assembly including the fluid level measurement apparatus 100 is activated upon turn-on of an ignition of the vehicle.

The control process starts at S101, where the control circuit 60 outputs the selection signal to the output switches 63 and 64 to select the first output circuit 40 corresponding to the electrical resistance fluid level sensor 20. Then, the control process proceeds to S102, where the control circuit 60 outputs the control signal to the power switch 66 to turn OFF the power switch 66, thereby interrupting the power supply to the fluid level sensor connected to the socket section 93.

Then, the control process proceeds to S103, where the control circuit 60 applies the constant current to the fluid level sensor connected to the socket section 93. Then, the control process proceeds to S104, where the control circuit 60 obtains the voltage generated by the first output circuit 40 upon application of the constant current to the fluid level sensor connected to the socket section 93. Further, at S104, the control circuit 60 measures the resistance of the fluid level sensor connected to the socket section 93 based on the obtained voltage.

Then, the control process proceeds to S105, where the control circuit 60 determines which type of fluid level sensor is connected to the socket section 93 by comparing the measured resistance with the threshold resistance Rx. Specifically, when the resistance measured at S104 is equal to or less than the threshold resistance Rx corresponding to YES at S105, the control circuit 60 determines that the fluid level sensor connected to the socket section 93 is the electrical resistance fluid level sensor 20, and the control process proceeds to S107. In contrast, when the resistance measured at S104 is greater than the threshold resistance Rx corresponding to NO at S105, the control circuit 60 determines that the fluid level sensor connected to the socket section 93 is the magnetoelectric fluid level sensor 30, and the control process proceeds to S106.

At S106, the control circuit 60 outputs the selection signal to the output switches 63 and 64 to select the second output circuit 50 corresponding to the magnetoelectric fluid level sensor 30, thereby switching the output circuit for generating the detection voltage from the first output circuit 40 to the second output circuit 50. In this way, at S105 and S106, the output circuit corresponding to the fluid level sensor connected to the fluid level measurement apparatus 100 is selected from multiple output circuits including the first and second output circuits 40 and 50. After S106, the control process proceeds to S107.

At S107, the control circuit 60 outputs the control signal to the power switch 66 to turn ON the power switch 66, thereby allowing the power supply to the fluid level sensor connected to the socket section 93.

After S107, the control process proceeds to S108. At S108, the control circuit 60 obtains the detection voltage, which is generated by the output circuit corresponding to the fluid level sensor connected to the fluid level measurement apparatus 100, and calculates the fluid level from the obtained detection voltage. Then, for example, the fluid level calculated by the control circuit 60 is transmitted to the fuel meter 80 and displayed on the fuel meter 80. The control circuit 60 repeats the control process shown in FIG. 3 until the combination meter assembly is deactivated upon turn-off of the ignition of the vehicle.

As described above, according to the first embodiment, when the fluid level sensor connected to the fluid level measurement apparatus 100 is changed to another fluid level sensor, the control circuit 60 causes the output circuit corresponding to the other fluid level sensor to generate the detection voltage. Thus, the control circuit 60 can accurately calculate the fluid level from the detection voltage. In this way, the fluid level measurement apparatus 100 can support multiple fluid level sensors of different types, including the electrical resistance fluid level sensor 20 and the magnetoelectric fluid level sensor 30, each of which detects the fluid level and produces the output indicative of the detected fluid level in a different way.

Further, according to the first embodiment, the electrical resistance fluid level sensor 20 and the magnetoelectric fluid level sensor 30 have different internal resistances. Therefore, the control circuit 60 can determine which of the electrical resistance fluid level sensor 20 and the magnetoelectric fluid level sensor 30 is connected by measuring the resistance of the connected fluid level sensor by applying the constant current to the connected fluid level sensor.

Specifically, the resistance of the magnetoelectric fluid level sensor 30 is greater than the resistance of the electrical resistance fluid level sensor 20. Therefore, when the measured resistance is greater than the threshold resistance Rx, it can be assumed that the magnetoelectric fluid level sensor 30 is connected to the fluid level measurement apparatus 100 rather than the electrical resistance fluid level sensor 20. Thus, the control circuit 60 can accurately determine the fluid level sensor connected to the fluid level measurement apparatus 100 based on the measured resistance.

The fluid level sensor connected to the fluid level measurement apparatus 100 operates on the power supplied from the meter power supply circuit 10. If the control circuit 60, which is separate from the meter power supply circuit 10, applies the constant current to the fluid level sensor under the condition where the meter power supply circuit 10 supplies the power to the fluid level sensor, the control circuit 60 may detect the internal resistance of the fluid level sensor inaccurately.

To prevent this disadvantage, according to the first embodiment, when the control circuit 60 applies the constant current to the fluid level sensor, the control circuit 60 outputs the control signal to the power switch 66 to turn off the power switch 66, thereby interrupting the power supply to the fluid level sensor. In such an approach, the control circuit 60 can detect the internal resistance of the fluid level sensor accurately and determine the fluid level sensor accurately.

Thus, even when the fluid level sensor connected to the fluid level measurement apparatus 100 is changed to another fluid level sensor, the control circuit 60 can cause the output circuit corresponding to the other fluid level sensor to generate the detection voltage. Thus, the control circuit 60 can accurately calculate the fluid level from the detection voltage. In this way, the fluid level measurement apparatus 100 can support various types of fluid level sensors, each of which detects the fluid level and produces an output indicative of the detected fluid level in a different way.

Further, according to the first embodiment, the plug sections 27, 37 of the fluid level sensors 20, 30 have the same shape corresponding to the socket section 93 of the fluid level measurement apparatus 100. Therefore, each of the fluid level sensors 20, 30 can be connected to the fluid level measurement apparatus 100 individually.

Further, according to the first embodiment, the control circuit 60 selects the first output circuit 40 corresponding to the electrical resistance fluid level sensor 20 by controlling the output switches 63 and 64 from when the control circuit 60 starts a determination process for determining the connected fluid level sensor to when the control circuit 60 finishes the determination process. This is based on the assumption that the electrical resistance fluid level sensor 20, which is cheaper than the magnetoelectric fluid level sensor 30, is usually connected to the fluid level measurement apparatus 100 rather than the magnetoelectric fluid level sensor 30. Thus, the fluid level measurement apparatus 100 can start to measure the fluid level smoothly.

A correspondence between the first embodiment and claims is as follows. The meter power supply circuit 10 corresponds to a power supply circuit. The arm holder 23 and the magnet holder 33 correspond to a rotation member. The plug sections 27 and 37 correspond to a connection section. The first and second output circuits 40 and 50 correspond to a plurality of output circuits of different types. The control circuit 60 corresponds to a calculation circuit, a determination circuit, a constant current application circuit, and a resistance measurement circuit. The control circuit 60 and the output switches 63 and 64 correspond to a selection circuit. The control circuit 60 and the power switch 66 correspond to a stop circuit. The socket section 93 corresponds to a mating section. The fuel tank 90 of the vehicle corresponds to a container. The fuel corresponds to fluid.

Second Embodiment

Figure 4:
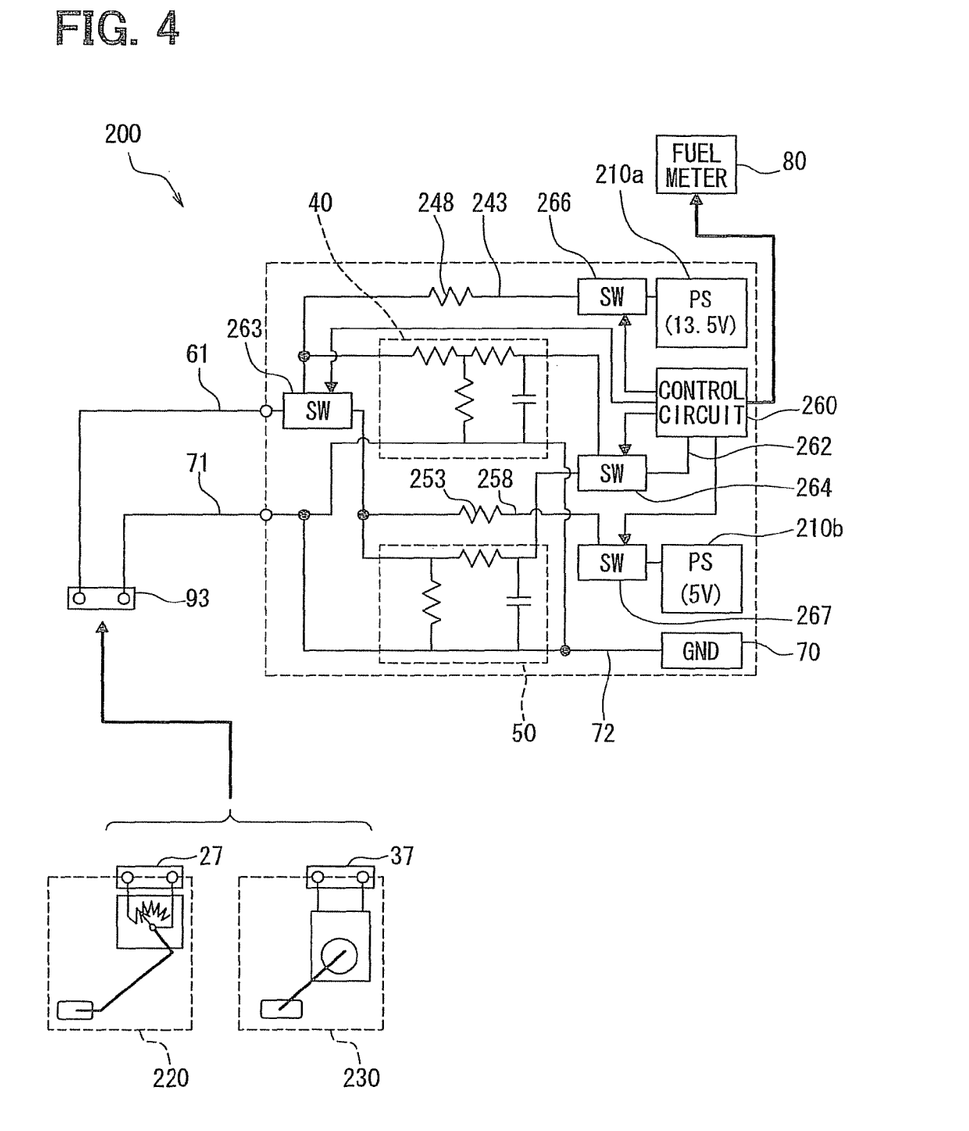
FIG. 4 is a block diagram of a fluid level measurement apparatus according to a second embodiment of the present invention.
Figure 5:
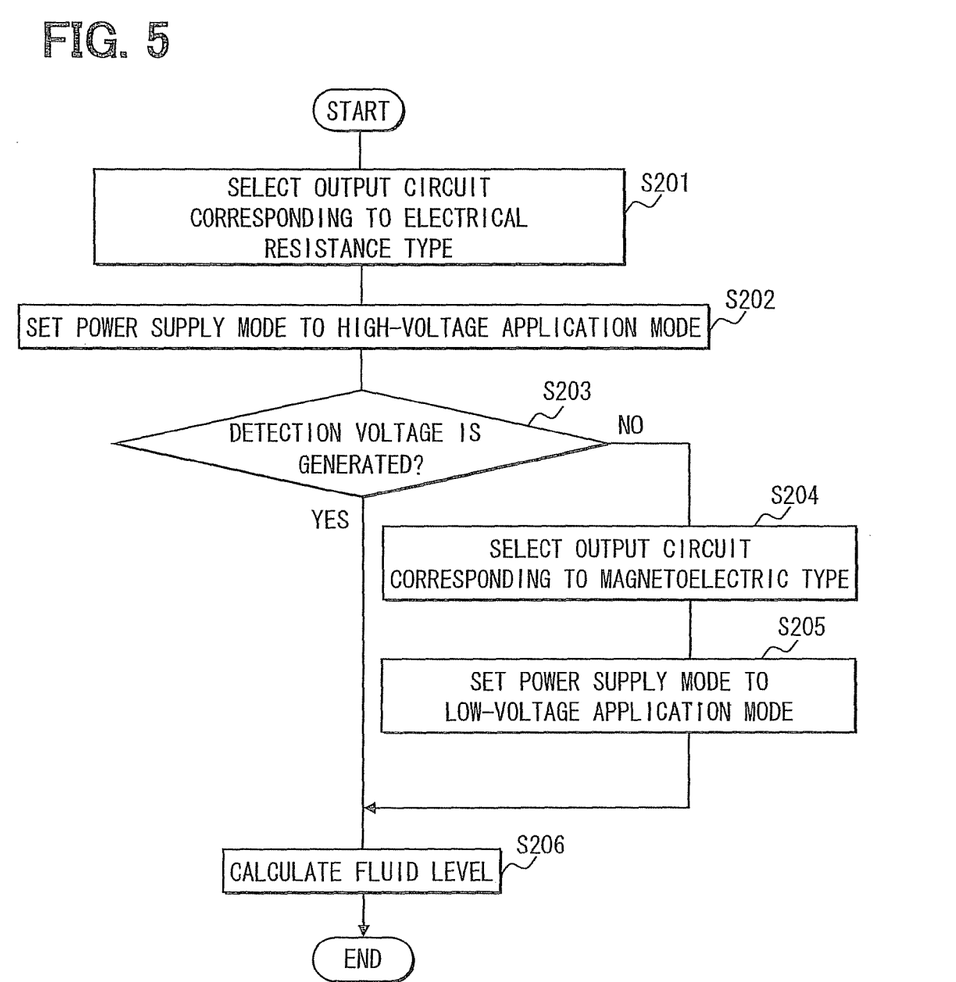
FIG. 5 is a flow diagram illustrating a control process executed by a control circuit of the fluid level measurement apparatus of FIG. 4.

A fluid level measurement apparatus 200 according to a second embodiment of the present invention is described below with reference to FIGS. 4 and 5. A difference between the first and second embodiments is as follows.

The fluid level measurement apparatus 200 is designed to support multiple fluid level sensors of different types, including an electrical resistance fluid level sensor 220 and a magnetoelectric fluid level sensor 230, each of which detects the fluid level and produces an output indicative of the detected fluid level in a different way.

According to the first embodiment, each of the electrical resistance fluid level sensor 20 and the magnetoelectric fluid level sensor 30 is supplied with the same operation voltage (e.g., 5 volts) from the meter power supply circuit 10 of the fluid level measurement apparatus 100. In contrast, according to the second embodiment, the fluid level sensor 220 and the magnetoelectric fluid level sensor 230 are supplied with different operation voltages. The fluid level sensor 220 and the magnetoelectric fluid level sensor 230 are described in detail below.

The electrical resistance fluid level sensor 220 corresponds to the electrical resistance fluid level sensor 20 of the first embodiment, and a first voltage (e.g., about 13.5V) greater than 5 volts is applied to the electrical resistance fluid level sensor 220. The electrical resistance fluid level sensor 220 operates on the first voltage to detect the fluid level and produces an output indicative of the detected fluid level. The electrical resistance fluid level sensor 220 has the plug section 27 connectable to the socket section 93 of the fluid level measurement apparatus 200.

The magnetoelectric fluid level sensor 230 corresponds to the magnetoelectric fluid level sensor 230 of the first embodiment, and a second voltage of about 5 volts is applied to the magnetoelectric fluid level sensor 230. The magnetoelectric fluid level sensor 230 operates on the second voltage to detect the fluid level and produces an output indicative of the detected fluid level. The magnetoelectric fluid level sensor 230 has the plug section 37 connectable to the socket section 93 of the fluid level measurement apparatus 200. Further, when a voltage greater than a predetermined threshold voltage (e.g., about 7 volts) is applied to the magnetoelectric fluid level sensor 230, the magnetoelectric fluid level sensor 230 stops producing the output.

Next, the fluid level measurement apparatus 200 is described below. As shown in FIG. 4, the fluid level measurement apparatus 200 includes an ignition power supply circuit 210a, a meter power supply circuit 210b, a control circuit 260, the socket section 93, the first output circuit 40, the second output circuit 50, and the ground circuit 70.

The ignition power supply circuit 210a and the meter power supply circuit 210b are connected to the battery of the vehicle and supplied with power mainly from the battery.

The ignition power supply circuit 210a supplies the power, supplied form the battery, to the fluid level sensor connected to the fluid level measurement apparatus 200. For example, the ignition power supply circuit 210a applies a voltage of 13.5 volts to the fluid level sensor. The ignition power supply circuit 210a is electrically connected to the socket section 93 through the wire 61 and a wire 243 to supply the power to the fluid level sensor. Specifically, the wire 243 is arranged in the combination meter assembly and connects the wire 61 to the ignition power supply circuit 210a. The wire 61 connects the wire 243 to the socket section 93, which is located in the fuel tank 90. The wire 243 is provided with a high-voltage power switch 266 and a resistor 248. The high-voltage power switch 266 is turned ON and OFF in accordance with a control signal from the control circuit 260 to allow and interrupt the power supply from the ignition power supply circuit 210a to the fluid level sensor. The resistor 248 is a passive element having a predetermined resistance and stabilizes the voltage applied from the ignition power supply circuit 210a to the fluid level sensor.

The meter power supply circuit 210b is substantially configured in the same manner as the meter power supply circuit 10 of the first embodiment. The meter power supply circuit 210b converts the power, which is supplied from the battery, into suitable power for the fluid level sensor connected to the fluid level measurement apparatus 200 and supplies the converted power to the connected fluid level sensor. For example, the meter power supply circuit 210b applies a voltage of 5 volts to the fluid level sensor. Specifically, the meter power supply circuit 210b is electrically connected through the wire 61 and a wire 253 to the socket section 93 to supply the power to the fluid level sensor connected to the fluid level measurement apparatus 200. The wire 253 connects the wire 61 to the ignition power supply circuit 210a. The wire 253 is provided with a low-voltage power switch 267 and a resistor 258. The low-voltage power switch 267 is turned ON and OFF in accordance with the control signal from the control circuit 60 to allow and interrupt the power supply from the meter power supply circuit 210b to the fluid level sensor. The resistor 258 is a passive element having a predetermined resistance and stabilizes the voltage applied from the meter power supply circuit 210b to the fluid level sensor.

The control circuit 260 corresponds to the control circuit 60 of the first embodiment and calculates the fluid level from the detection voltage that is generated based on the output of the electrical resistance fluid level sensor 220 or the magnetoelectric fluid level sensor 230. The control circuit 260 is a microcomputer or the like and executes operations based on programs. The control circuit 260 is connected through a wire 262 to an output switch 264. The control circuit 260 outputs the selection signal, for selecting either the first output circuit 40 or the second output circuit 50, to an output switch 263 and the output switch 264. The output switches 263 and 264 apply the detection voltage generated by the selected output circuit to the control circuit 260 through the wire 262.

The control circuit 260 outputs the control signal, for switching a power supply mode for the fluid level sensor connected to the socket section 93, to the high-voltage power switch 266 and the low-voltage power switch 267. The power supply mode includes a stop mode, a high-voltage application mode, and a low voltage application mode. In the stop mode, each of the high-voltage power switch 266 and the low-voltage power switch 267 is OFF so that the power supply from each of the ignition power supply circuit 210a and the meter power supply circuit 210b can be interrupted. In the high-voltage application mode, the high-voltage power switch 266 is ON, and the low-voltage power switch 267 is OFF. Thus, in the high-voltage application mode, the power supply from the meter power supply circuit 210b is interrupted, and the power supply from the ignition power supply circuit 210a is allowed so that the voltage of 13.5 volts (i.e., first voltage), which is greater than the threshold voltage of 7 volts, can be applied from the ignition power supply circuit 210a to the connected fluid level sensor. In the low-voltage application mode, the high-voltage power switch 266 is OFF, and the low-voltage power switch 267 is ON. Thus, in the low-voltage application mode, the power supply from the ignition power supply circuit 210a is interrupted, and the power supply from the meter power supply circuit 210b is allowed so that the voltage of 5 volts (i.e., second voltage), which is less than the threshold voltage of 7 volts, can be applied from the meter power supply circuit 210b to the connected fluid level sensor.

To determine which type of fluid level sensor is connected to the socket section 93, the control circuit 260 switches the power supply mode to the high-voltage application mode by controlling the high-voltage power switch 266 and the low-voltage power switch 267 and also selects the first output circuit 40 by controlling the outputs switches 263 and 264. As mentioned previously, although the electrical resistance fluid level sensor 220 produces the output upon application of the first voltage, the magnetoelectric fluid level sensor 230 stops producing the output upon application of the first voltage, because the first voltage is greater than the threshold voltage. Therefore, when the fluid level sensor connected to the socket section 93 is the electrical resistance fluid level sensor 220, the connected fluid level sensor produces the output in the high-voltage application mode. In contrast, when the fluid level sensor connected to the socket section 93 is the magnetoelectric fluid level sensor 230, the connected fluid level sensor produce no output in the high-voltage application mode. Therefore, the control circuit 260 can determine which type of fluid level sensor is connected to the socket section 93 by determining whether the detection voltage is generated in the high-voltage application mode. Then, the control circuit 260 outputs the selection signal to the output switches 263 and 264 to select the output circuit corresponding to the determined fluid level sensor.

Next, a control process executed by the control circuit 260 to determine the fluid level sensor connected to the fluid level measurement apparatus 200 and to calculate the fluid level from the detection voltage generated based on the output of the determined fluid level sensor is described below with reference to FIG. 5. The control circuit 260 starts to execute the control process when the combination meter assembly including the fluid level measurement apparatus 200 is activated upon turn-on of the ignition of the vehicle.

The control process starts at S201, where the control circuit 260 outputs the selection signal to the output switches 263 and 264 to select the first output circuit 40 corresponding to the electrical resistance fluid level sensor 220. Then, the control process proceeds to S202, where the control circuit 260 outputs the control signal to the high-voltage power switch 266 and the low-voltage power switch 267 to turn ON the high-voltage power switch 266 and to turn OFF the low-voltage power switch 267, thereby switching the power supply mode to the high-voltage application mode.

Then, the control process proceeds to S203, where the control circuit 260 determines which type of fluid level sensor is connected to the socket section 93 by determining whether the detection voltage is generated. Specifically, when the control circuit 260 obtains the detection voltage from the first output circuit 40 corresponding to YES at S203, the control circuit 260 determines that the fluid level sensor connected to the socket section 93 is the electrical resistance fluid level sensor 220, and the control process proceeds to S206. In contrast, when the control circuit 260 does not obtain the detection voltage from the first output circuit 40 corresponding to NO at S203, the control circuit 260 determines that the fluid level sensor connected to the socket section 93 is the magnetoelectric fluid level sensor 230, and the control process proceeds to S204.

At S204, the control circuit 260 outputs the selection signal to the output switches 263 and 264 to select the second output circuit 50 corresponding to the magnetoelectric fluid level sensor 230. Then, the control process proceeds to S205, where the control circuit 260 outputs the control signal to the high-voltage power switch 266 and the low-voltage power switch 267 to turn OFF the high-voltage power switch 266 and to turn ON the low-voltage power switch 267, thereby switching the power supply mode from the high-voltage application mode to the low-voltage application mode. Then, the control process proceeds to S206.

At S206, the control circuit 260 obtains the detection voltage, which is generated by the output circuit corresponding to the fluid level sensor connected to the fluid level measurement apparatus 200, and calculates the fluid level from the obtained detection voltage. Then, for example, the fluid level calculated by the control circuit 260 is transmitted to the fuel meter 80 and displayed on the fuel meter 80. The control circuit 260 repeats the control process shown in FIG. 5 until the combination meter assembly is deactivated upon turn-off of the ignition of the vehicle.

As described above, according to the second embodiment, when the fluid level sensor connected to the fluid level measurement apparatus 200 is changed to another fluid level sensor, the control circuit 260 causes the output circuit corresponding to the other fluid level sensor to generate the detection voltage. Thus, the control circuit 260 can accurately calculate the fluid level from the detection voltage. In this way, the fluid level measurement apparatus 200 can support various types of fluid level sensors including the electrical resistance fluid level sensor 220 and the magnetoelectric fluid level sensor 230, each of which detects the fluid level and produces an output indicative of the detected fluid level in a different way.

Further, according to the second embodiment, the magnetoelectric fluid level sensor 230 stops outputting the detection result upon application of the voltage greater than the threshold voltage. In such an approach, the control circuit 260 can accurately determine the fluid level sensor connected to the fluid level measurement apparatus 200 based on whether the detection voltage is generated upon application of the voltage greater than the threshold voltage to the fluid level sensor. Therefore, even when the fluid level sensor connected to the fluid level measurement apparatus 200 is changed to another fluid level sensor, the control circuit 260 can cause the output circuit corresponding to the other fluid level sensor to generate the detection voltage. Thus, the control circuit 260 can accurately calculate the fluid level from the detection voltage. In this way, the fluid level measurement apparatus 200 can support various types of fluid level sensors.

Further, according to the second embodiment, the electrical resistance fluid level sensor 220 and the magnetoelectric fluid level sensor 230 operate on different voltages. The control circuit 260 applies suitable voltages to the electrical resistance fluid level sensor 220 and the magnetoelectric fluid level sensor 230 by controlling the high-voltage power switch 266 and the low-voltage power switch 267. Thus, the electrical resistance fluid level sensor 220 and the magnetoelectric fluid level sensor 230 can output the detection result accurately. Therefore, even when the fluid level sensor connected to the fluid level measurement apparatus 200 is changed to another fluid level sensor, the control circuit 260 can cause the output circuit corresponding to the other fluid level sensor to generate the detection voltage. Thus, the control circuit 260 can accurately calculate the fluid level from the detection voltage. In this way, the fluid level measurement apparatus 200 can support various types of fluid level sensors.

Generally, an operation voltage of an electrical resistance fluid level sensor is higher than an operation voltage of a magnetoelectric fluid level sensor. Therefore, it is preferable that the electrical resistance fluid level sensor 220 operate on the voltage greater than the threshold voltage and that the magnetoelectric fluid level sensor 230 operate on the voltage less than the threshold voltage.

A correspondence between the second embodiment and claims is as follows. The ignition power supply circuit 210*a* corresponds to a high-voltage application circuit. The meter power supply circuit 210*b* corresponds to a low-voltage application circuit. The electrical resistance fluid level sensor 220 corresponds to a first fluid level sensor. The magnetoelectric fluid level sensor 230 corresponds to a second fluid level sensor. The control circuit 260 corresponds to a calculation circuit and a determination circuit. The control circuit 260 and the output switches 263 and 264 correspond to a selection circuit. The control circuit 60, the high-voltage power switch 266, and the low-voltage power switch 267 correspond to a switching circuit.

Modifications

The above embodiments described above can be modified in various ways, for example, as follows.

In the embodiments, the plug sections of the fluid level sensors to be connected to the fluid level measurement apparatus have the same shape. Alternatively, the plug sections can have different shapes. In this case, the socket section 93 of the fluid level measurement apparatus has socket portions with different shapes corresponding to the respective plug sections, and the control circuit determines the fluid level sensor connected to the fluid level measurement apparatus by determining the socket portion mating with the corresponding plug section. That is, a method for determining the connected fluid level sensor is not limited to those described in the embodiments.

In the embodiments, the electrical resistance fluid level sensor and the magnetoelectric fluid level sensor are described as examples of liquid level sensors to be connected to the fluid level measurement apparatus. Other type of fluid level sensor can be connected to the fluid level measurement apparatus. For example, instead of or in addition to the electrical resistance fluid level sensor and the magnetoelectric fluid level sensor, an ultrasonic fluid level sensor can be connected to the fluid level measurement apparatus. In this case, the ultrasonic fluid level sensor is attached to the ceiling surface of the fuel tank 90 and emits ultrasonic waves to the fluid level to measure the distance form the ceiling surface to the fluid level.

In the first embodiment, during the period of time where the constant current is applied to the fluid level sensor, the control circuit 60 interrupts the power supply to the fluid level sensor by controlling the power switch 66. Alternatively, the control circuit 60 can continue the power supply to the fluid level sensor during the period of time where the constant current is applied to the fluid level sensor, as long as the internal resistance of the fluid level sensor can be accurately measured under the condition where the power supply to the fluid level sensor is continued.

In the first embodiment, when the measured internal resistance of the fluid level sensor is greater than the threshold resistance Rx, the control circuit 60 determines that the fluid level sensor is the magnetoelectric fluid level sensor 30. This is based on the assumption that the internal resistance of the electrical resistance fluid level sensor 20 is less than the threshold resistance Rx and the internal resistance of the magnetoelectric fluid level sensor 30. Therefore, a condition based on which the control circuit 60 determines the fluid level sensor can be adjusted according to the internal resistances of the fluid level sensors to be connected to the fluid level measurement apparatus 100. For example, if the internal resistance of the electrical resistance fluid level sensor 20 is greater than the internal resistance of the magnetoelectric fluid level sensor 30, the control circuit 60 can determine that the fluid level sensor is the electrical resistance fluid level sensor 20 when the measured internal resistance of the fluid level sensor is greater than the threshold resistance Rx. Likewise, the threshold resistance Rx can be adjusted according to the internal resistances of the fluid level sensors to be connected to the fluid level measurement apparatus 100.

In the second embodiment, the magnetoelectric fluid level sensor 230 stops outputting the detection result upon application of the voltage greater than the threshold voltage. However, if the operation voltage of the electrical resistance fluid level sensor 220 is greater than the operation voltage of the magnetoelectric fluid level sensor 230, the electrical resistance fluid level sensor 220 can be configured to stop outputting the detection result upon application of the voltage greater than the threshold voltage instead.

In the embodiments, the first and second output circuits 40 and 50 are constructed with multiple resistors and a capacitor. The first and second output circuits 40 and 50 are not limited to the embodiments. For example, when it is determined that a specific fluid level sensor is connected, the first and second output circuits 40 and 50 can be configured so that the output of the first and second output circuits 40 and 50 can be inputted directly to the control circuit.

In the embodiments, the first and second output circuits 40 and 50 are switched by the pair of the output switches 63 and 64. However, if the control circuit 60 can obtain a suitable detection voltage, the first and second output circuits 40 and 50 can be switched by a single output switch connected between the control circuit and the first and second output circuits 40 and 50.

In the embodiments, in an initial stage before the fluid level sensor connected to the fluid level measurement apparatus 100 is determined, the control circuit selects the first output circuit 40 corresponding to the electrical resistance fluid level sensor. Alternatively, in the initial stage, the control circuit can select the second output circuit 50 corresponding to the electrical resistance fluid level sensor. Alternatively, in the initial stage, the control circuit can be connected to the socket section through a circuit other than the first and second output circuits 40 and 50.

In the embodiments, the control circuit serves as the calculation circuit, the determination circuit, the selection circuit, the constant current application circuit, the resistance measurement circuit, and the stop circuit. Alternatively, the control circuit can be divided into multiple circuits, each of which serves as the corresponding circuit. In the embodiments, the control circuit is configured as a digital circuit including a microcomputer for executing programs. Alternatively, the control circuit can be configured as a specific analog circuit that does not need programs.

In the embodiments, the fluid level measurement apparatus is configured to measure the level of fuel of a vehicle. Alternatively, the fluid level measurement apparatus can be configured to measure the level of fluid other than fuel of a vehicle. For example, the fluid level measurement apparatus can be configured to measure the level of brake fluid, engine coolant, or engine oil of a vehicle. Alternatively, the fluid level measurement apparatus can be configured to measure the level of fluid that is not used for a vehicle. For example, the fluid level measurement apparatus can be configured to measure the level of fluid used for household appliances.

Such changes and modifications are to be understood as being within the scope of the present invention as defined by the appended claims.

The invention claimed is:

1. A fluid level measurement apparatus configured to support a plurality of fluid level sensors, each fluid level sensor detecting a level of fluid in a container and producing an output indicative of the detected level of the fluid, the fluid level measurement apparatus adapted to be connected to any one of the plurality of fluid level sensors to measure the level of the fluid, the fluid level measurement apparatus comprising:

a plurality of output circuits, each output circuit generating a detection voltage based on the output of a corresponding one of the plurality of fluid level sensors;

a calculation circuit configured to calculate the level of the fluid from any of the detection voltages of the plurality of output circuits;

a determination circuit configured to determine which fluid level sensor of the plurality of fluid level sensors is connected to the fluid level measurement apparatus;

a selection circuit configured to select one of the plurality of output circuits corresponding to the determined fluid level sensor and configured to allow the calculation circuit to obtain the detection voltage generated by the selected output circuit;

a constant current application circuit configured to apply a predetermined constant current to the connected fluid level sensor; and a resistance measurement circuit configured to measure a resistance of the connected fluid level sensor upon application of the constant current to the connected fluid level sensor, wherein the determination circuit determines the connected fluid level sensor based on the measured resistance;

the plurality of fluid level sensors comprises a magnetoelectric fluid level sensor and an electrical resistance fluid level sensor, the magnetoelectric fluid level sensor uses a magnetoelectric element to detect the level of the fluid by detecting a rotation angle of a rotation member that rotates according to the fluid level, the electrical resistance fluid level sensor uses a variable resistor to detect the level of the fluid by detecting the rotation angle of the rotation member, and when the measured resistance is greater than a predetermined threshold resistance, the determination circuit determines that the connected fluid level sensor is the magnetoelectric fluid level sensor.

2. The fluid level measurement apparatus according to claim 1, further comprising:
a mating section, wherein
the plurality of fluid level sensors have respective mating sections that are identical in shape and connectable to the mating section of the fluid level measurement apparatus, and
the mating section of the fluid level measurement apparatus mates with the mating section of the connected fluid level sensor to supply the output of the connected fluid level sensor to the corresponding output circuit.

3. The fluid level measurement apparatus according to claim 1, further comprising:
a power supply circuit configured to supply power to the connected fluid level sensor to allow the connected fluid level sensor to detect the level of the fluid; and
a stop circuit configured to interrupt the power supply from the power supply circuit to the connected fluid level sensor when the constant current application circuit applies the constant current to the connected fluid level sensor.

4. A fluid level measurement apparatus configured to support a plurality of fluid level sensors, each fluid level sensor detecting a level of fluid in a container and producing an output indicative of the detected level of the fluid, the fluid level measurement apparatus adapted to be connected to any one of the plurality of fluid level sensors to measure the level of the fluid, the fluid level measurement apparatus comprising:

a plurality of output circuits, each output circuit generating a detection voltage based on the output of a corresponding one of the plurality of fluid level sensors;

a calculation circuit configured to calculate the level of the fluid from any of the detection voltages of the plurality of output circuits;

a determination circuit configured to determine which fluid level sensor of the plurality of fluid level sensors is connected to the fluid level measurement apparatus;

a selection circuit configured to select one of the plurality of output circuits corresponding to the determined fluid level sensor and configured to allow the calculation circuit to obtain the detection voltage generated by the selected output circuit;

a high-voltage application circuit configured to apply a high voltage greater than a predetermined threshold voltage to the connected fluid level sensor, wherein the plurality of fluid level sensors comprises a first fluid level sensor and a second fluid level sensor, the first fluid level sensor will not produce the output when the high voltage is applied thereto, the second fluid level sensor produces the output when the high voltage is applied thereto, and when the connected fluid level sensor does not produce the output upon application of the high voltage thereto, the determination circuit determines that the connected fluid level sensor is the first fluid level sensor.

5. The fluid level measurement apparatus according to claim 4, further comprising:
a low-voltage application circuit configured to apply a low voltage less than the threshold voltage to the connected fluid level sensor; and
a switching circuit, wherein
when the determination circuit determines that the connected fluid level sensor is the first fluid level sensor, the switching circuit prevents the high-voltage application circuit from applying the high voltage to the connected fluid level sensor and allows the low-voltage application circuit to apply the low voltage to the connected fluid level sensor.

6. The fluid level measurement apparatus according to claim 4, wherein
the first fluid level sensor is a magnetoelectric fluid level sensor that uses a magnetoelectric element to detect the level of the fluid by detecting a rotation angle of a rotation member that rotates according to the fluid level, and
the second fluid level sensor is an electrical resistance fluid level sensor that uses a variable resistor to detect the level of the fluid by detecting the rotation angle of the rotation member.

7. The fluid level measurement apparatus according to claim 1, wherein
the selection circuit selects the output circuit corresponding to the electrical resistance fluid level sensor from when the determination circuit starts a determination process for determining the connected fluid level sensor to when the determination circuit finish the determination process.

* * * * *